United States Patent
Scribano et al.

(10) Patent No.: US 7,860,046 B2
(45) Date of Patent: *Dec. 28, 2010

(54) METHOD AND APPARATUS FOR PROVIDING BEARER FORMAT TYPE INFORMATION IN A CELLULAR COMMUNICATION SYSTEM

(75) Inventors: Gino A. Scribano, St. Charles, IL (US); Lewis J. Milton, Glencoe, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1546 days.

This patent is subject to a terminal disclaimer.

(21) Appl. No.: 10/899,292

(22) Filed: Jul. 26, 2004

(65) Prior Publication Data

US 2005/0124299 A1 Jun. 9, 2005

Related U.S. Application Data

(60) Provisional application No. 60/527,949, filed on Dec. 8, 2003.

(51) Int. Cl.
 *H04Q 7/00* (2006.01)
(52) U.S. Cl. ............... 370/328; 370/466; 455/552.1
(58) Field of Classification Search ............. 370/328, 370/349; 455/422.1, 450
 See application file for complete search history.

(56) References Cited

U.S. PATENT DOCUMENTS 7,142,881 B2 11/2006 Sekino et al.

2003/0210659 A1 11/2003 Chu et al.
2004/0166834 A1* 8/2004 Omar et al. ........... 455/414.1

FOREIGN PATENT DOCUMENTS

| EP | 1069738 A1 | 1/2001 |
| WO | 0070885 | 11/2000 |
| WO | 0215625 A1 | 2/2002 |

OTHER PUBLICATIONS

Schulzrine, H.: RTP Profile for Audio and Video Conferences with Minimal Control, Internet Official Protocol Standards (STD1), Network Working Group, Audio-Video Transport Working Group, Request for Comments: 1890, Category: Standards Track, GMD Fokus, Jan. 1996, rfc1890_AV_conference_minControl.txt, pp. 1-17.

Handley, M. et al.: SDP: Session Description Protocol, Internet Official Protocol Standards (STD1), Network Working Group, Request for Comments: 2327, ISI/LBNL, Category: Standards Track, Apr. 1998, The Internet Society (1998), pp. 1-42.

* cited by examiner

*Primary Examiner*—Temica M Beamer

(57) ABSTRACT

A communication system provides for a distribution of bearer format type information among Network Elements located along a bearer path of a communication session, thereby facilitating a selection of a bearer format type for the communication session. The bearer format type information informs of bearer format types supported by each of the Network Elements. In one embodiment of the present invention, the bearer format types are conveyed in bearer format type data fields of bearer format type messages, which data fields may be modified by each Network Element in order to identify the bearer format type capabilities of the Network Element.

16 Claims, 8 Drawing Sheets

US 7,860,046 B2

METHOD AND APPARATUS FOR PROVIDING BEARER FORMAT TYPE INFORMATION IN A CELLULAR COMMUNICATION SYSTEM

CROSS-REFERENCE TO RELATED APPLICATION(S)

This application is related to U.S. Patent Application No. 60/487,182, filed Jul. 17, 2003, and further claims priority from provisional application Ser. No. 60/527,949, entitled "METHOD AND APPARATUS FOR PROVIDING BEARER FORMAT TYPE INFORMATION IN A CELLULAR COMMUNICATION SYSTEM," filed Dec. 8, 2003, which is commonly owned and incorporated herein by reference in its entirety.

FIELD OF THE INVENTION

The present invention relates generally to cellular communication systems, and, in particular, to transcoding functionality in a cellular communication system.

BACKGROUND OF THE INVENTION

In a typical Code Division Multiple Access (CDMA) cellular network, such as a second generation (2G) CDMA communication network, transcoders are located in each of an originating mobile station (MS), a terminating MS, and a base station (BS), and in particular in a base station controller (BSC), serving each of the originating and terminating MSs. The transcoder of the BS serving the originating MS receives compressed voice packets from the MS and converts the voice packets to pulse code modulated (PCM) signals for transmission through a circuit switched core network included in the cellular network. The BS then transmits the PCM signals upstream through the circuit switched core network and, via the core network, to a Public Switched Telephone Network (PSTN) coupled to the operator's cellular network. Similarly, PCM signals received by a 2G CDMA cellular network from a PSTN that are intended for the terminating MS are transmitted as PCM signals through the circuit switched core network to the BS servicing the terminating MS, where the transcoder in the BS converts the PCM signals to compressed voice packets. The BS then transmits the compressed voice packets to the terminating MS.

The development of next generation CDMA networks, such as a cdma2000 cellular network, have allowed system operators to install Packet Switched core networks in place of, or in parallel with the circuit switched core networks, thereby permitting data packets to be transmitted through the cellular networks in place of, or in parallel with circuit switched signals. The installation of such Packet Switched core networks permits a system operator to transmit voice data as a compressed voice packet through the Packet Switched core network, rather than transmit voice data as PCM signals through the circuit switched core network. To facilitate transmission of voice through a cellular network in a data packet format, operators of cdma2000 cellular networks have expressed an interest in relocating the transcoders closer to the PSTN. In addition, a relocation of transcoders to a more centralized location deeper in the cellular network can reduce system costs by providing a more centralized transcoder function, as opposed to a widely distributed, BS-based, transcoder function, and by permitting voice services to be transported over more of a backhaul network in a compressed format as opposed to an uncompressed format.

However, when a legacy CDMA communication system is upgraded with a relocated transcoder function, a result may be a provision of a transcoding function in each of a core network and a BS. Furthermore, some systems may service mobile stations that are not capable of transmitting voice in a format compatible for transmission over a Packet Switched core network, thus necessitating a transcoding function in a BS. A result is that multiple transcoding functions may reside along a voice signal's path, which multiple transcoding functions may each support a same or different bearer format type. In order to determine an appropriate bearer format type for a communication session involving an originating mobile station (MS) and a terminating MS, the transcoding capabilities of the originating and terminating MSs, as well as the transcoding capabilities of any transcoding functions residing along a voice bearer path associated with the MSs, must be made known to a decision-making entity.

In addition, each time voice is re-encoded/re-decoded by a transcoder a quality of the voice degrades. As a result, the standards underlying the next generation CDMA networks further allow for, but do not specify implementation of, transcoder-free operation (TrFO), wherein voice is transmitted through the cellular network without application to the voice, by the network, of any transocoder function. However, in order to for a cellular network to engage in transcoder-free operation or to engage appropriate transcoders into operation, the network must determine the most appropriate bearer format type to be supported by each of the Network Elements involved in the call, including an originating MS and the terminating MS for the case of mobile-to-mobile calls.

Therefore, there exists a need for a method and apparatus for determining the bearer format type capabilities of each MS involved in a communication session and further of the transcoding functions within Network Elements (for example, Media Gateways) located along a voice bearer path associated with the call session.

DETAILED DESCRIPTION OF THE INVENTION

Figure 1:
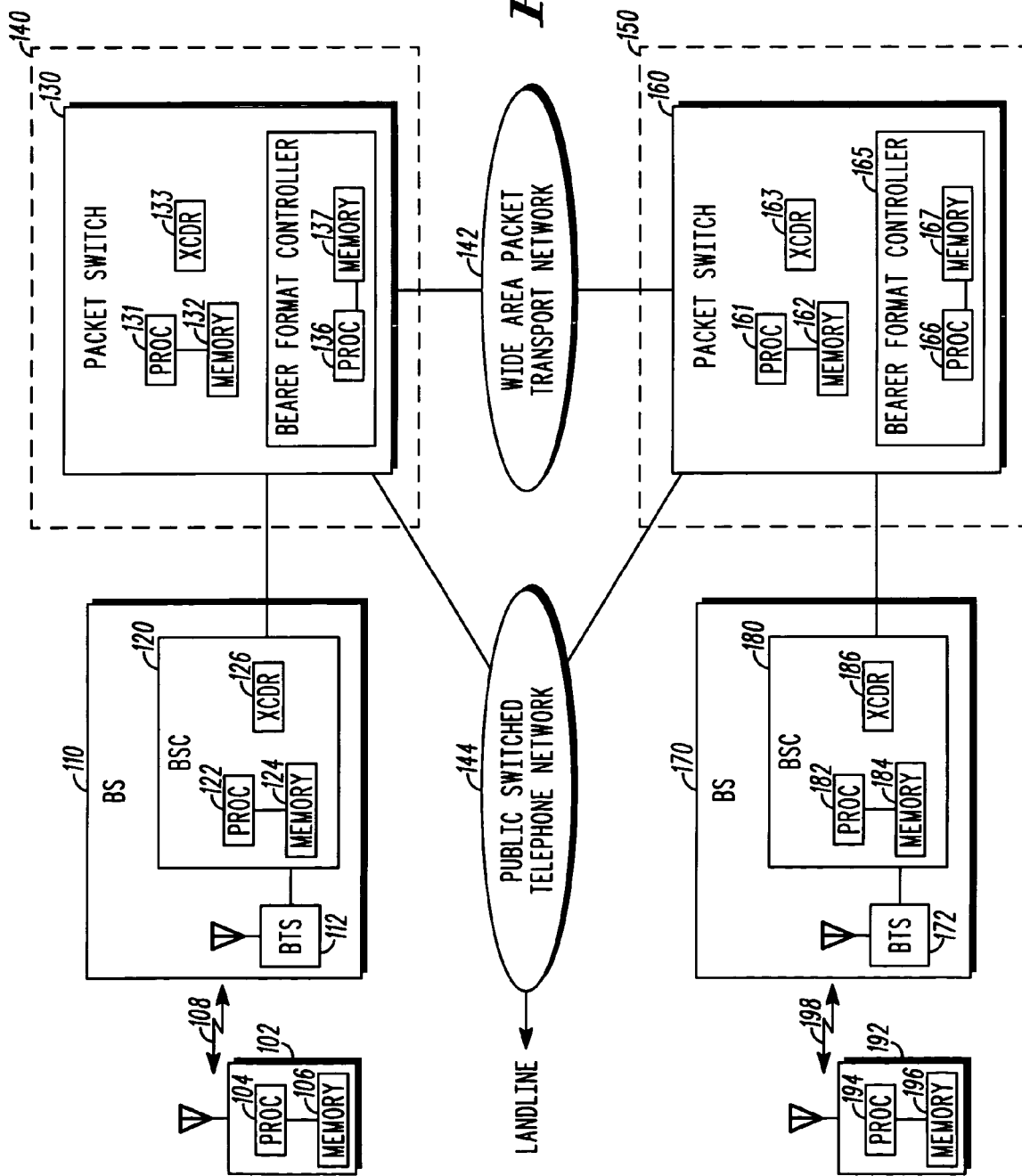
FIG. 1 is a block diagram of a wireless communication system in accordance with an embodiment of the present invention.
Figure 2A:
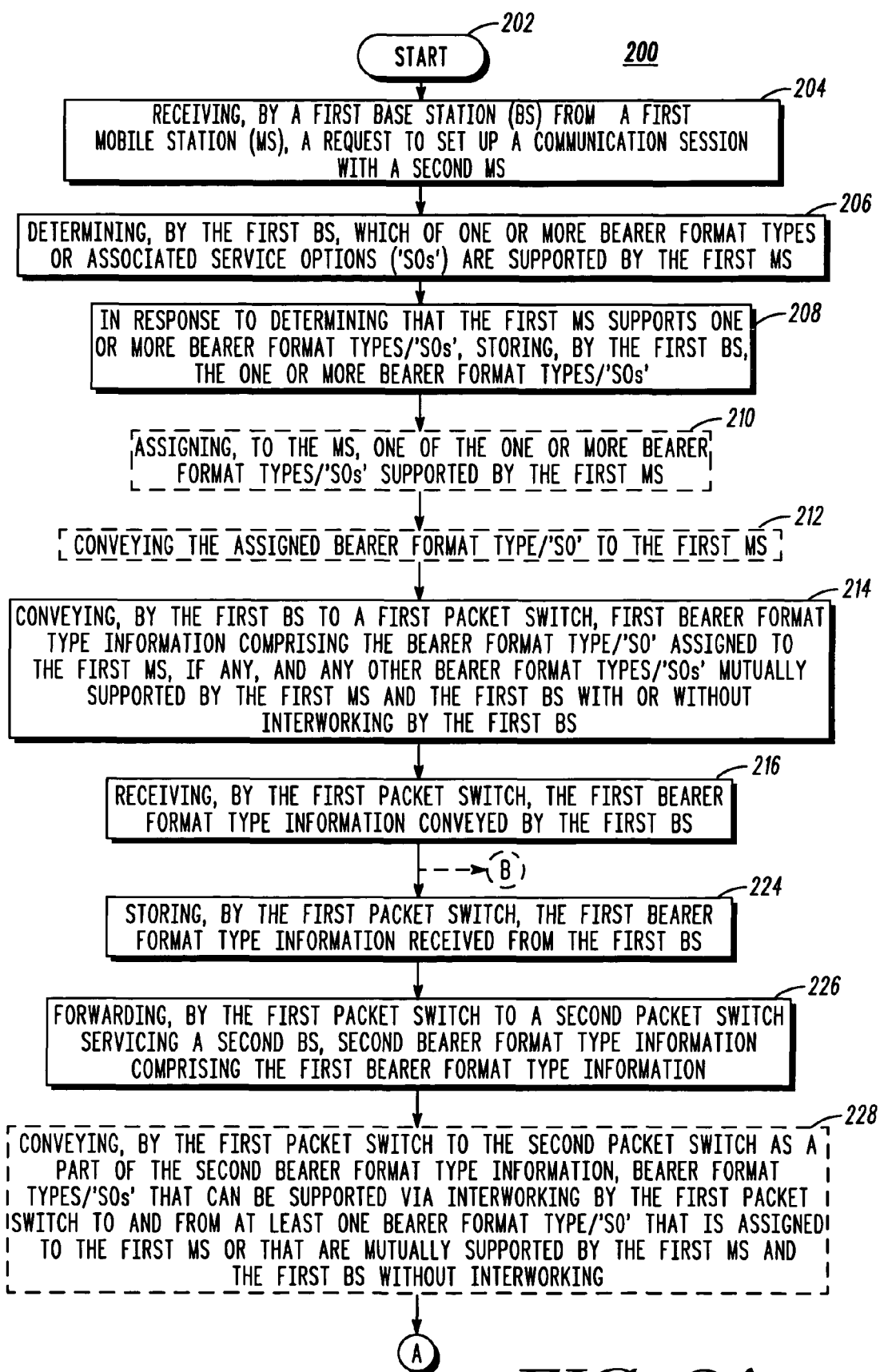
FIG. 2A is a logic flow diagram 200 of steps executed by the communication system of FIG. 1 in distributing information concerning the bearer format type capabilities of each mobile station engaged in a communication session and each network transcoder located along a voice bearer path associated with the mobile stations in accordance with various embodiments of the present invention.
Figure 2B:
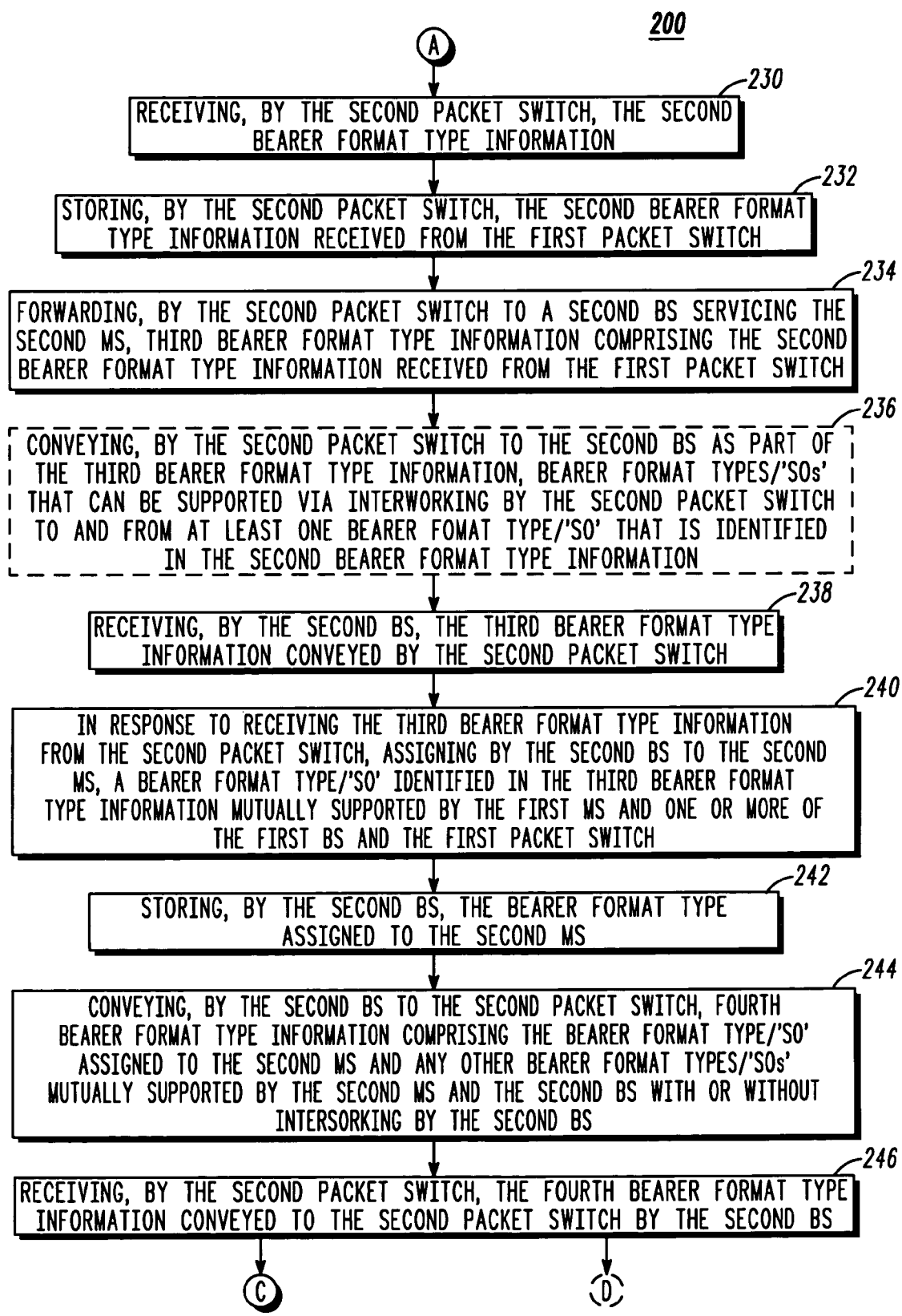
FIG. 2B is a continuation of the logic flow diagram of FIG. 2A depicting steps executed by the communication system of FIG. 1 in distributing information concerning the bearer format type capabilities of each mobile station engaged in a communication session and of each network transcoder located along a voice bearer path associated with the mobile stations in accordance with various embodiments of the present invention.
Figure 2C:
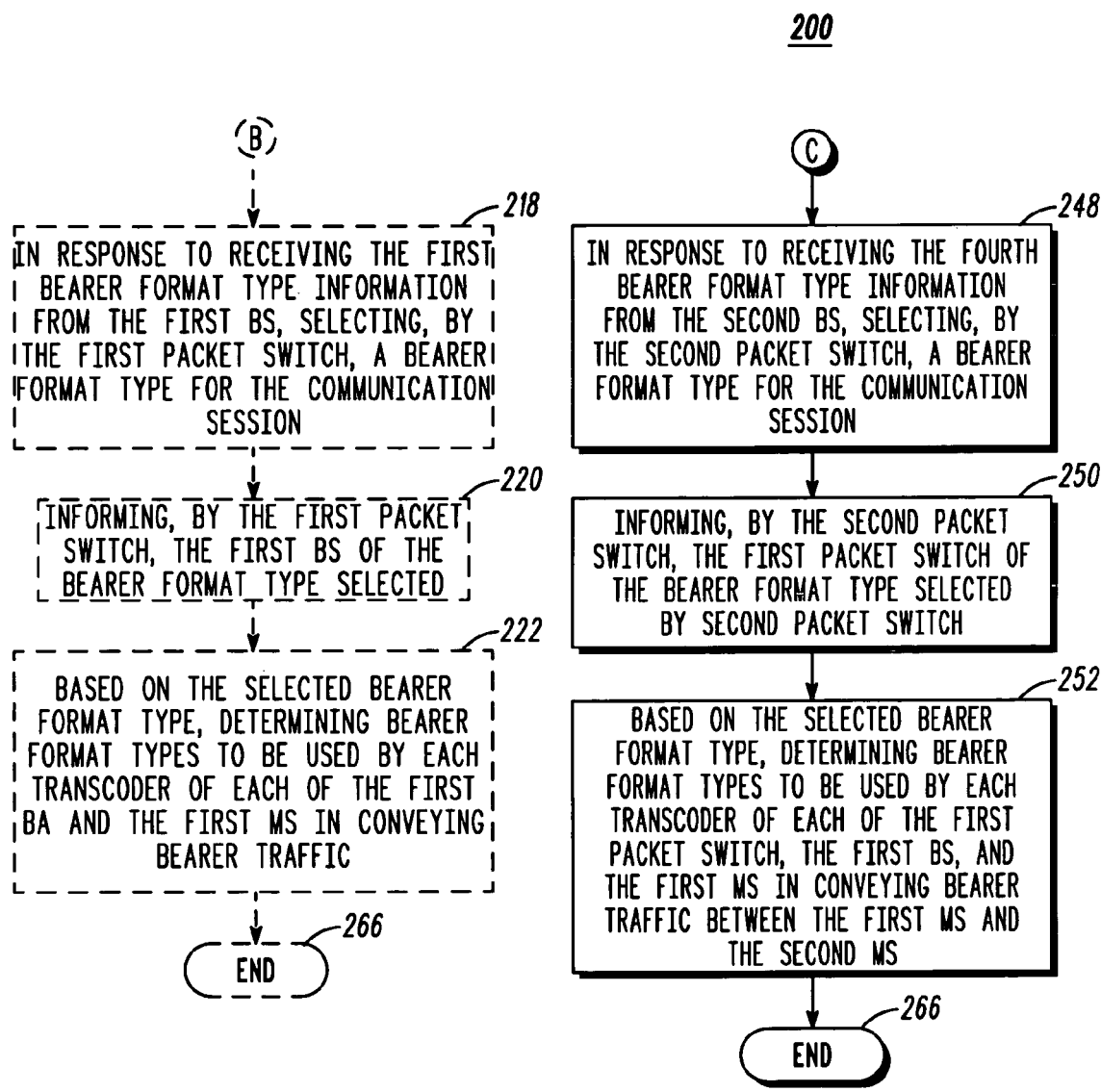
FIG. 2C is a continuation of the logic flow diagrams of FIGS. 2A and 2B depicting steps executed by the communication system of FIG. 1 in distributing information concerning the bearer format type capabilities of each mobile station engaged in a communication session and of each network transcoder located along a voice bearer path associated with the mobile stations in accordance with various embodiments of the present invention.
Figure 2D:
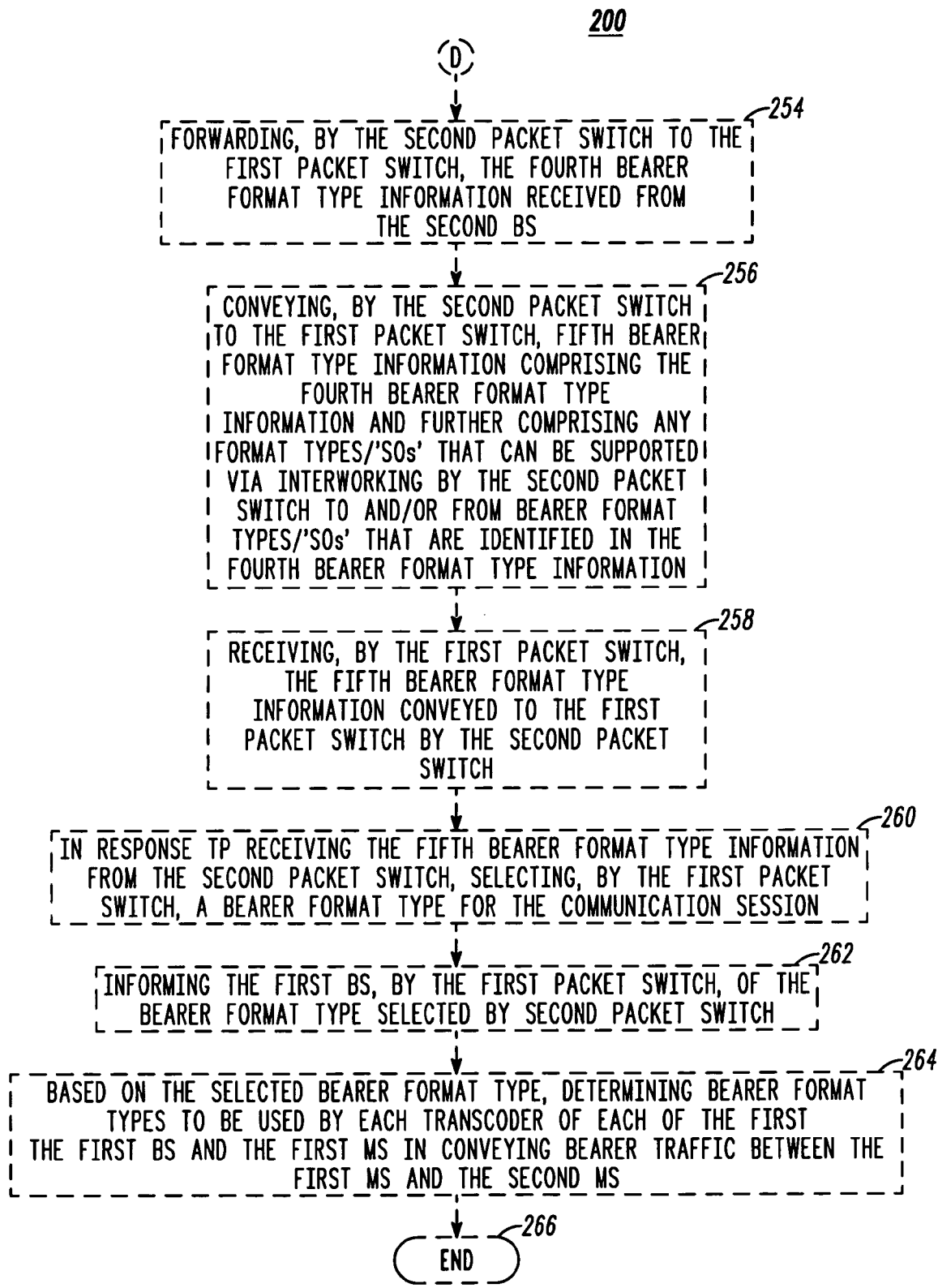
FIG. 2D is a continuation of the logic flow diagrams of FIGS. 2A, 2B, and 2C depicting steps executed by the communication system of FIG. 1 in distributing information concerning the bearer format type capabilities of each mobile station engaged in a communication session and of each network transcoder located along a voice bearer path associated with the mobile stations in accordance with various embodiments of the present invention.

To address the need for a method and apparatus for determining the bearer format type capabilities of each mobile station involved in a communication session and further of the transcoding functions within Network Elements (for example, Media Gateways) located along a voice bearer path associated with the call session, a communication system is provided that distributes bearer format type information among Network Elements located along a bearer path of a communication session, thereby facilitating a selection of a bearer format type for the communication session. The bearer format type information informs of bearer format types supported by each of the Network Elements. In one embodiment of the present invention, the bearer format types are conveyed in bearer format type data fields of bearer format type messages, which data fields may be modified by each Network Element in order to identify the bearer format type capabilities of the Network Element.

Generally, an embodiment of the present invention encompasses a method for providing bearer format type capabilities in a cellular communication system. The method includes assembling a message comprising bearer format type information, wherein the bearer format type information comprises, when a first bearer format type is assigned to a mobile station, the assigned bearer format type, and further comprises, when the mobile station and a Network Element serving the mobile station mutually support a second bearer format, the second bearer format and conveying the assembled message.

Another embodiment of the present invention encompasses a method for providing bearer format type capabilities in a cellular communication system. The method includes receiving bearer format type information comprising at least one of a first bearer format type assigned to a mobile station and a second bearer format type mutually supported by the mobile station and a base station serving the mobile station and conveying the received bearer format type information to a Network Element other than the base station.

Still another embodiment of the present invention encompasses a method for providing bearer format type capabilities in a cellular communication system. The method includes receiving bearer format type information comprising at least one of a first bearer format type assigned to a first mobile station and a second bearer format type mutually supported by the first mobile station and a base station serving the first mobile station and assigning a bearer format type to a second mobile station based on the received bearer format type information.

Yet another embodiment of the present invention encompasses a method for providing bearer format type capabilities in a cellular communication system, the method comprising assembling a message comprising a first data field identifying a bearer format type assigned to a mobile station and at least a second data field identifying a bearer format mutually supported by a mobile station and a base station serving the mobile station.

Still another embodiment of the present invention encompasses a method for providing bearer format type capabilities in a cellular communication system. The method includes conveying first bearer format type information, wherein the first bearer format type information comprises, when a first bearer format type is assigned to a first mobile station, the assigned bearer format type and further comprises, the assigned first bearer format and, when the first mobile station and a first base station mutually support a second bearer format, the second bearer format. The method further includes receiving the first bearer format type information from the first base station, in response to receiving the first bearer format type information, determining whether a first Network Element other than the first base station and one or more of the first mobile station and the first base station mutually support a third bearer format type, and further in response to receiving the first bearer format type information, conveying second bearer format information comprising the first bearer format type information and, when the first Network Element and one or more of the first mobile station and the first base station mutually support a third bearer format type, the third bearer format type. The method further includes receiving the second bearer format type information, in response to receiving the second bearer format type information, determining whether a second Network Element other than the first base station and one or more of the first mobile station, the first base station, and the first Network Element mutually support a fourth bearer format type, and further in response to receiving the second bearer format type information, conveying third bearer format type information comprising the received second bearer format type information and, when the second Network Element and one or more of the first mobile station, the first base station, and the first Network Element mutually support a fourth bearer format type, the fourth bearer format type. The method further includes receiving the third bearer format type information and, in response to receiving the second bearer format type information, assigning a bearer format to a second mobile station based on the third bearer format type information.

Yet another embodiment of the present invention encompasses a base station controller that assembles a message comprising bearer format type information, wherein the bearer format type information comprises, when a first bearer format type is assigned to a mobile station, the assigned bearer format type, and further comprises, when the mobile station and a Network Element serving the mobile station mutually support a second bearer format, the second bearer format, and conveys the assembled message.

Still another embodiment of the present invention encompasses a Packet Switch comprising at least one memory device that maintains at least one bearer format type supported by an associated transcoder. The Packet Switch further comprises a processor coupled to the at least one memory device that receives bearer format type information comprising at least one of a first bearer format type assigned to a mobile station and a second bearer format type mutually supported by the mobile station and a base station serving the mobile station and conveys the received bearer format type information to another Network Element.

Yet another embodiment of the present invention encompasses a base station controller that receives bearer format type information comprising at least one of a first bearer format type assigned to a first mobile station and a second bearer format type mutually supported by the first mobile station and a base station serving the first mobile station and that assigns a bearer format type to a second mobile station based on the received bearer format type information.

Still another embodiment of the present invention encompasses a computer readable medium storing instructions for assembling a message comprising a first data field identifying a bearer format type assigned to a mobile station and at least a second data field identifying a bearer format mutually supported by a mobile station and a base station serving the mobile station.

Yet another embodiment of the present invention encompasses a system for distributing bearer format type information. The system includes a base station that comprises a first transcoder and that conveys a message comprising bearer format type information, wherein the bearer format type information comprises, when a first bearer format type is assigned to a mobile station, the assigned bearer format type, and further comprises, when the mobile station and the base station mutually support a second bearer format, the second bearer format. The system further includes a bearer format controller that receives the bearer format type information from the base station, selects a bearer format type for a communication session associated with the mobile station based on the received bearer format type information, and informs the base station of the selected bearer format type.

Still another embodiment of the present invention encompasses a system for distributing bearer format type information. The system includes a first base station having a first transcoder and that conveys first bearer format type information, wherein the first bearer format type information comprises, when a first bearer format type is assigned to a first mobile station, the assigned bearer format type and further comprises, when the first mobile station and the first base station mutually support a second bearer format, the second bearer format. The system further includes a first Packet Switch having a second transcoder and that receives the first bearer format type information from the first base station, determines whether the first Packet Switch and one or more of the first mobile station and the first base station mutually support a third bearer format type, and conveys second bearer format information comprising the first bearer format type information and, when the first Packet Switch and one or more of the first mobile station and the first base station mutually support a third bearer format type, the third bearer format type. The system further includes a second Packet Switch having a third transcoder and that receives the second bearer format type information from the first base station, determines whether the second Packet Switch and one or more of the first mobile station, the first base station, and the first Packet Switch mutually support a fourth bearer format type, and conveys third bearer format type information comprising the received second bearer format type information and, when the second Packet Switch and one or more of the first mobile station, the first base station, and the first Packet Switch mutually support a fourth bearer format type, the fourth bearer format type. The system further includes a second base station having a fourth transcoder and that receives the third bearer format type information from the second Packet Switch and assigns a bearer format to a second mobile station serviced by the second base station based on the third bearer format type information.

The present invention may be more fully described with reference to FIGS. 1-5. FIG. 1 is a block diagram of a wireless communication system 100 in accordance with an embodiment of the present invention. Communication system 100 includes a first base station (BS) 110 that comprises a first base transceiver station (BTS) 112 operably coupled to a first base station controller (BSC) 120. Communication system 100 further includes a first core network 140 that is upstream from, and coupled to, BS 110, and in particular to BSC 120, and that comprises a first Packet Switch 130. BS 110 provides communication services to a first mobile station 102 via BTS 112 and further via a first air interface 108.

Communication system 100 further includes a second base station (BS) 170 that comprises a second base transceiver station (BTS) 172 operably coupled to a second base station controller (BSC) 180. Communication system 100 further includes a second core network 150 that is upstream from, and coupled to, BS 170, and in to particular BSC 180, and that comprises a second Packet Switch 160. BS 170 provides communication services to a second MS 192 via BTS 172 and further via a second air interface 198.

Each Packet Switch 130, 160 may comprise one or more of a Media Gateway, a 3G (Third Generation) Mobile Switching Center (MSCe), and a packet voice Soft Switch that is available from Motorola, Inc, of Schaumburg, Ill., and that has been modified to perform the functions described herein. Each air interface 108, 198 comprises a forward link (not shown) having multiple communication channels, such as one or more forward link control channels, one or more forward link traffic channels, and a forward link paging channel, and a reverse link (not shown) having multiple communication channels, such as one or more reverse link control channels, one or more reverse link traffic channels, and a reverse link access channel.

Each of MSs 102 and 192, BSCs 120 and 180, and Packet Switches 130 and 160 includes a respective processor 104, 194, 122, 182, 131, 161, such as one or more microprocessors, microcontrollers, digital signal processors (DSPs), combinations thereof or such other devices known to those having ordinary skill in the art. Each of MSs 102 and 192, BSCs 120 and 180, and Packet Switches 130 and 160 further includes a respective one or more memory devices 106, 196, 124, 184, 132, 162 associated with the respective processor 104, 194, 122, 182, 131, 161, such as random access memory (RAM), dynamic random access memory (DRAM), and/or read only memory (ROM) or equivalents thereof, that store data and programs that may be executed by the processor. Each of BSCs 120 and 180 and Packet Switches 130 and 160 further optionally includes a respective transcoder 126, 186, 133, 163 that is capable of is capable of decoding voice data packets into at least one of multiple bearer format types, such as SMV (IS-893), EVRC (IS-127), 13k-QCELP (IS-733), 8k-QCELP (IS-96C), and G.711. The one or more memory devices 106, 196 of each of MSs 102 and 192, as well as the one or more memory devices 124, 184, 132, 162 of each of BSCs 120 and 180 and Packet Switches 130 and 160 when the BSC or Packet Switch includes a transcoder, further stores the bearer format types supported by the MS or associated transcoder, that is, by trancoders 126, 186, 133 and 163 with respect to BSCs 120 and 180 and Packet Switches 130 and 160.

Each Packet Switch 130, 160 further includes a respective bearer format controller 135, 165 that is capable of determining a bearer format of the multiple bearer formats possible in communication system 100 that will encode and decode voice traffic of various bearer formats during a communication session involving MS 102. Each bearer format controller 135, 165 includes a respective processor 136, 166, such as one or more microprocessors, microcontrollers, DSPs, combinations thereof or such other devices known to those having ordinary skill in the art. Each bearer format controller 135, 165 further includes a respective one or more associated memory devices 137, 167, such as RAM, DRAM, and/or ROM or equivalents thereof, that maintain data and programs that may be executed by the corresponding processor. However, in another embodiment of the present invention, each bearer format controller 135, 165 may be implemented in a respective processor 131, 161, and a respective one or more memory devices 132, 162, of the associated Packet Switch 130, 160.

First core network 140 communicates with second core network 150 via a wide area packet transport network 142. As a result, first MS 102 is able to engage in voice communications with second MS 192 via first air interface 108, first BS 110, first core network 140, wide area packet transport network 142, second core network 150, second BS 170, and second air interface 198. Together, BSs 110 and 170, core networks 140 and 150, and wide area packet transport network 142 are collectively referred to herein as a communication system network.

Communication system 100 comprises a wireless packet voice communication system. In order for each MS 102, 192 to engage in a voice communication with another MS, each of BSs 110, 170, core networks 140, 150, and wide area packet transport network 142 operates in accordance with well-known wireless telecommunications protocols. By operating in accordance with well-known protocols, a user of an MS 102, 192 can be assured that the MS will be able to communicate with a respective serving BS 110, 170 and a respective serving core network 140, 150, and establish a communication link with a network external to the serving core network, such as core networks 150 and 140, respectively. Preferably, communication system 100 operates in accordance with the 3GPP2 and TIA/EIA (Telecommunications Industry Association/Electronic Industries Association) IS-2001, or IOS (Inter Operability Specification), standards, which provides a compatibility standard cdma2000 or 1xEV-DO systems and wherein each communication channel of the multiple communication channels of each of the forward link and the reverse link of air interfaces 108 and 198 comprises one or more orthogonal codes, such as Walsh codes. The standard specifies wireless telecommunications system operating protocols, including radio system parameters and call processing procedures. However, those who are of ordinary skill in the art realize that communication system 100 may operate in accordance with any one of a variety of wireless packet-oriented voice communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

When an originating MS, such as MS 102, establishes a communication session with BS 110, in turn establishing communication sessions with Packet Switch 130, communication system 100 may determine one or more bearer format types to be used during the communication session. Further, a mobile-to-mobile communication session may additionally involve a terminating wireless communication network, that is, core network 150, BS 170 and a terminating MS, such as MS 192, in regard to which communication system 100 may further determine one or more bearer format types to be used by the terminating wireless communication network during the communication session. In addition, communication system 100 may determine the bearer format required to establish the mobile-to-mobile communication session as a transcoder free operation (TrFO), wherein voice traffic propagates through the communication system without being interworked, that is, translated, by any network transcoder 126, 133, 163, 186. However, in order for communication system 100 to determine the one or more bearer format types or whether to establish the communication session as a TrFO, the communication system must determine the bearer format type capabilities of each MS 102, 192 engaged in the communication session and further of each transcoder 126, 133, 163, 186 located along a voice bearer path associated with the MSs. Accordingly, communication system 100 provides a method and apparatus for distributing information concerning the bearer format type capabilities of each MS 102, 192 engaged in the communication session and further of each transcoder 126, 133, 163, 186 located along a voice bearer path associated with the communication session.

Referring now to FIGS. 2A, 2B, 2C, and 2D, a logic flow diagram 200 illustrates steps executed by communication system 100 in distributing information concerning the bearer format type capabilities of each MS, such as one or more of MSs 102 and 192, engaged in the communication session and further of each transcoder, such as one or more of trancoders 126, 133, 163 and 186, located along a voice bearer path associated with the MSs in accordance with an embodiment of the present invention. Logic flow diagram 200 begins (202) when MS 102 conveys to network 180, and in particular to BS 110 via BTS 112, and BS 110 receives (204), a request for service, that is, a request to establish a voice, or a voice and data, communication session with MS 192. Preferably, the request for service comprises an Origination Message as is known in the art, which Origination Message requests service and requires a Layer 2 acknowledgment. Equitably, the request for service may also comprise an Page Request message and requires a Page Response message. Unless otherwise specified herein, the functions performed herein by each MS 102, 192 are performed by the respective processor 106, 196 of the MS. Furthermore, unless otherwise specified herein, the functions performed herein by each of BS 110 and BS 170 are performed by a respective BSC 120, 180, and in particular a respective processor 122, 182 of the BSC, and the functions performed by BSCs 120 and 180, Packet Switches 130 and 160, and bearer format controllers 135 and 165 are respectively performed herein by processors 122, 182, 132, 162, 136, and 166.

In response to receiving the request for service, BS 110 determines (206) whether one or more bearer format types are supported by originating MS 102. In one embodiment of the present invention, BS 110 may determine whether one or more bearer format types are supported by originating MS 102 by first requesting, from the MS, the bearer format types supported by the MS. For example, as part of the setup of the communication session, BS 110 allocates a forward link traffic channel and a reverse link traffic in air interface 108 and further establishes a communication link between the BS and Packet Switch 130 for the communication session. Upon establishing the traffic channels and communication link, BS 110 conveys to MS 102 a request for a list of service configurations supported by MS 102. Preferably, the request is included in a Status Request/Status Response Order. In response to receiving the request, MS 102 conveys to BS 110 the Service Option (SO) capabilities of the MS, which SO capabilities include bearer format types supported by the MS.

In another embodiment of the present invention, BS 110 may be informed by MS 102 of the bearer format types supported by the MS without first prompting the MS for the bearer format types. For example, as part of the setup of the communication session, MS 102 may convey the bearer format types supported by the MS in any one of multiple reverse link signaling or paging messages, such as an Origination message or an Paging Response message, which have been formatted to include voice SOs corresponding to the supported bearer format types.

In response to receiving one or more bearer format types supported by MS 102, BS 110 stores (208), in association with the MS and in the one or more memory devices 124 of BSC 120, the one or more supported bearer format types or associated SOs. BS 110 may further assign (210) one of the one or more supported bearer format types to the MS, which assigned bearer format type is also stored by BS 110 in association with the MS and in the one or more memory devices 124 of BSC 120. However, in another embodiment of the present invention, BS 110 may determine to delay assignment of a bearer format type to MS 102. When BS 110 assigns a supported bearer format type to MS 102, in response to assigning the bearer format type, BS 110 conveys (212) the assigned bearer format type to the MS. For example, BS 110 may convey the assigned bearer format type to the MS via an SO assignment in a Service Connect Message/Service Response Order. MS 102 may or may not then acknowledge to BS 110 that the MS is able to support the assigned SO or bearer format type, for example by conveying a Service Connect Completion Message to the BS.

Based on the one or more supported bearer format types received from MS 102, BS 110 determines the bearer format types mutually supported by each of MS 102 and various resources under control of BS 110, such as radio traffic channels and transcoder 126 of BSC 120. BS 110 then conveys (214) to Packet Switch 130, and in particular to bearer format controller 135, and Packet Switch 130 receives (216) from the BS, first bearer format type information comprising the bearer format type assigned, if any, to MS 102 and any other bearer format types mutually supported by MS 102 and BS 110, with and/or without interworking by transcoder 126, that is, with and/or without requiring bearer translation performed by transcoder 126.

In one embodiment of the present invention, the one or more bearer format type data fields conveyed by BS 110 to Packet Switch 130 may then be propagated in bearer format type messages among the Network Elements located along a voice bearer path between originating MS 102 and a terminating Public Switched Telephone Network (PSTN) 144. The bearer format type messages comprise bearer format type data fields in which may be embedded bearer format type capabilities of an MS engaged in the communication session and one or more other Network Elements. Each Network Element, upon receiving a bearer format type message comprising the one or more bearer format type data fields, may then modify the data fields based on the bearer format types supported by a transcoder or other resources associated with the Network Element.

For example, in one such embodiment of the present invention, based on the first bearer format type information received from BS 110, Packet Switch 130, and in particular bearer format controller 135, is now informed of the bearer format types/SOs supported by MS 102 and BS 110. Based on the bearer format types/SOs supported by MS 102 and BS 110 and the bearer format type/SO capabilities of the Packet Switch, bearer format controller 135 selects (218) a bearer format type for the communication session. Packet Switch 130 then informs (220) BS 110 of the selected bearer format type. For example, in order to inform BS 110 of the selected bearer format type, when the first bearer format type information is received by Packet Switch 130 via a bearer format message comprising one or more bearer format type data fields, bearer format controller 135 may modify the one or more bearer format type data fields as described below with respect to FIG. 5 to identify the selected bearer format type. Bearer format controller 135 may then convey the modified one or more bearer format type data fields to BS 110 in a bearer format type message. Based on the selected bearer format type identified in the bearer format type message received from bearer format controller 135, BS 110 and MS 102 may determine (222) bearer format types to be used by their respective transcoders in conveying bearer traffic between MS 102 and MS 192. Logic flow 200 then ends (266).

In another embodiment of the present invention, wherein MS 102 engages in a mobile-to-mobile communication session with MS 192, in response to receiving (216) the first bearer format type information from BS 110, Packet Switch 130 stores (224) the received first bearer format type information in the one or more memory devices 132 of the Packet Switch or the one or more memory devices 137 of bearer format controller 135 and conveys (226) second bearer format type information that includes the received first bearer format type information to a Packet Switch that services terminating MS 192, that is, second Packet Switch 160. The one or more bearer format type data fields conveyed by BS 110 to Packet Switch 130 may then be propagated in bearer format type messages comprising the bearer format type data fields among the Network Elements located along a voice bearer path between originating MS 102 and terminating MS 192, that is, Network Elements 160 and 170. As a result, the one or more bearer format type data fields provide for a distribution, in communication system 100, of the bearer format type capabilities of originating MS 102, terminating MS 192, and each transcoder in a voice bearer path. Based on the data collected in the one or more bearer format type data fields, communication system 100 is able to determine a supportable bearer format type for the communication session and is further able to determine whether the communication session can support TrFO.

Figure 3:
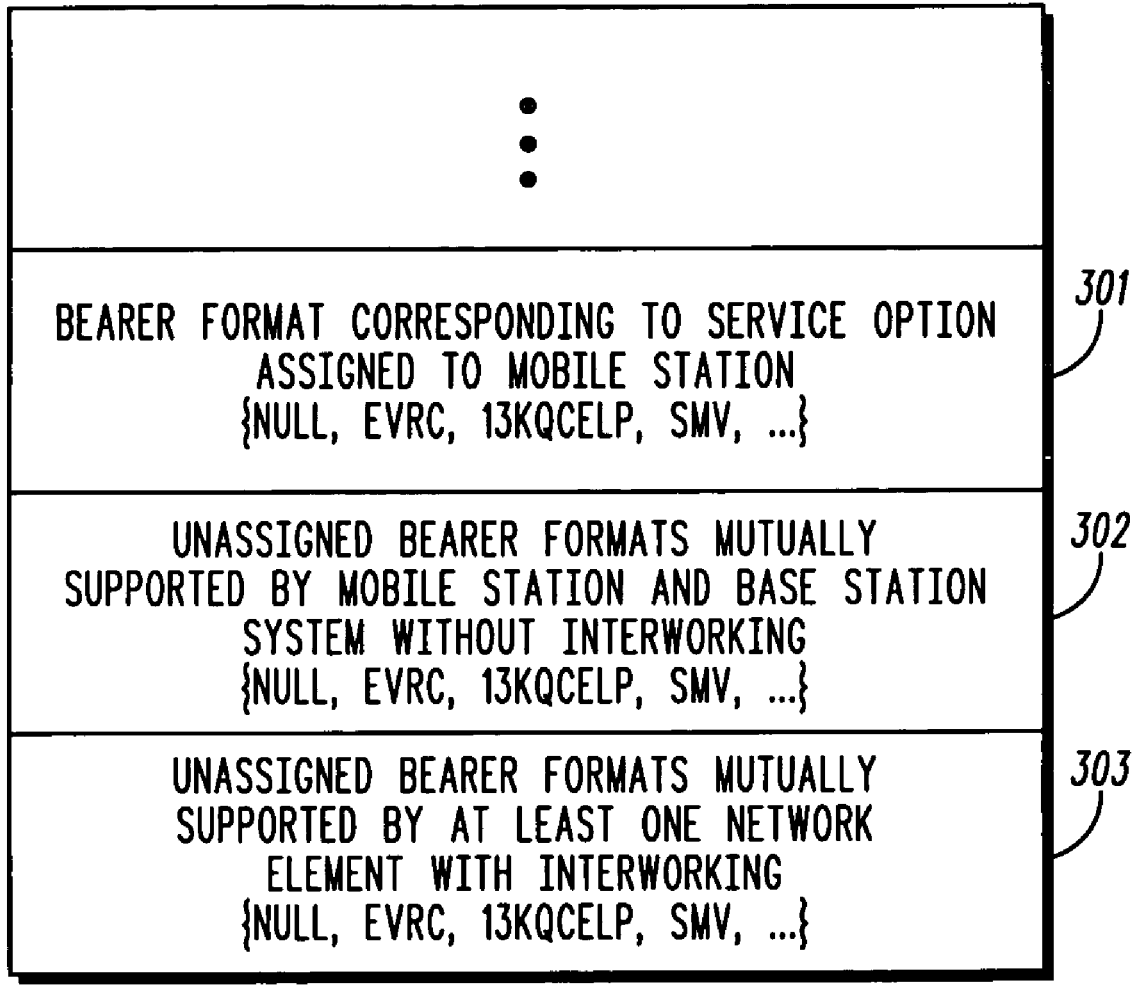
FIG. 3 is a block diagram of an exemplary bearer format type message that may be used by the communication system of FIG. 1 to distribute in the bearer format type capabilities of each mobile station engaged in a communication session and of each network transcoder located along a voice bearer path associated with the mobile stations in accordance with an embodiment of the present invention.

FIG. 3 is a block diagram of an exemplary bearer format type message 300 that may be used by communication system 100 to distribute in the bearer format type capabilities of one or more of originating MS 102 and terminating MS 192 and of each transcoder in a voice bearer path in accordance with an embodiment of the present invention. Bearer format type message 300 comprises multiple bearer format type data fields 301-303. Each of BSs 110 and 170, and in particular BSCs 120 and 180, and Packet Switches 130 and 160, may assemble a bearer format type message 300, such as the first, second, third, fourth, and fifth bearer type message listed below, based on instructions maintained in the respective at least one memory devices 124, 184, 132, and 162, of such BSs and Packet Switches. In addition, each of bearer format controllers 135 and 165 may assemble a bearer format type message 300 based on instructions maintained in the respective at least one memory devices 137, 167 of the bearer format controller.

Bearer format message 300 comprises a first bearer format type data field 301 of the multiple bearer format type data fields that informs of a bearer format type, or SO, assigned to MS 102. In one embodiment of the present invention, BS 110 may indicate a bearer format type assigned to MS 102 by embedding, in bearer format type data field 301, a value corresponding to the assigned bearer format type or SO. For example, BS 110 may embed a value corresponding to 'NULL,' indicating that the MS does not specify a bearer format type or has not been assigned a bearer format type, or may embed a value corresponding to the assigned bearer format type, such as a value corresponding to one of SMV, EVRC, 13k-QCELP, 8k-QCELP, and G.711. In another embodiment of the present invention, bearer format type data field 310 may comprises a list of bearer format types. BS 110 may then indicate a bearer format type assigned to MS 102 by tagging a bearer format type in the list. When MS 102 does not specify a bearer format type or has not been assigned a bearer format type data type, then BS 110 does not tag any bearer format type.

Bearer format message 300 further comprises a second bearer format type data field 302 of the multiple bearer format type data fields that informs of any bearer format type, or SO, that is mutually supported by MS 102 and the BS 110, without interworking, that is, without a need for transcoding by transcoder 126, other than the bearer format type assigned to the MS. Similar to data field 301, in one embodiment of the present invention, BS 110 may indicate each bearer format type that is mutually supported by MS 102 and BS 110 without interworking by embedding, in bearer format type data field 302, a value corresponding to each such mutually supported bearer format type or SO. When BS 110 knows of no mutually supported bearer format types, the BS may embed a value corresponding 'NULL.' Again, similar to data field 301, in another embodiment of the present invention, second bearer format type data field 302 may comprise a list of bearer format types. BS 110 may then indicate each mutually supported bearer format type by tagging the bearer format type. When BS 110 knows of no mutually supported bearer format types, the BS does not tag any bearer format type.

As a result, the bearer format types listed in the first and second bearer format type data fields 301, 302 are 'native' to MS 102, that is, are bearer format types that the MS can support without requiring any transcoding by BS 110. Since the MS supports each of these bearer format types, these are bearer format types that are eligible for TrFO with respect to MS 102.

Bearer format message 300 further comprises a third bearer format type data field 303 of the multiple bearer format type data fields that informs of any bearer format type, or SO, that is mutually supported by MS 102 and by a transcoder of at least one Network Element in communication system 100, such as by transcoder 126 of BS 110, transcoder 133 of Packet Switch 130, transcoder 163 of Packet Switch 160, and transcoder 186 of BS 170, and that requires interworking by the at least one Network Element transcoder. That is, each bearer format type identified in third bearer format type data field 303 is a bearer format type that is not directly supported by MS 102 but that can be translated by the at least one Network Element to a 'native' bearer format type supported by the MS. Each Network Element 110, 130, 160, and 170 may indicate a bearer format type that is mutually supported by MS 102 and the Network Element, that is, by a respective transcoder 126, 133, 163, 186 of the Network Element, with interworking by embedding, in bearer format type data field 303, a value corresponding to each bearer format type supported by the Network Element and not by MS 102, which bearer format type can be translated by the Network Element to a bearer format type supported by the MS. When the Network Element is not capable of supporting translation between any such bearer format types, the Network Element omits appending bearer format values in data field 303 or alternately, embeds a value corresponding 'NULL.' In another embodiment of the present invention, third bearer format type data field 303 may comprise a list of bearer format types. The Network Element may then indicate each bearer format type supported by the Network Element and not by MS 102, which bearer format type the can be translated by the Network Element to a bearer format type supported by the MS, by tagging the bearer format type. When the Network Element is not capable of supporting translation between any such bearer format types, the Network Element does not tag any bearer format type.

Figure 4:
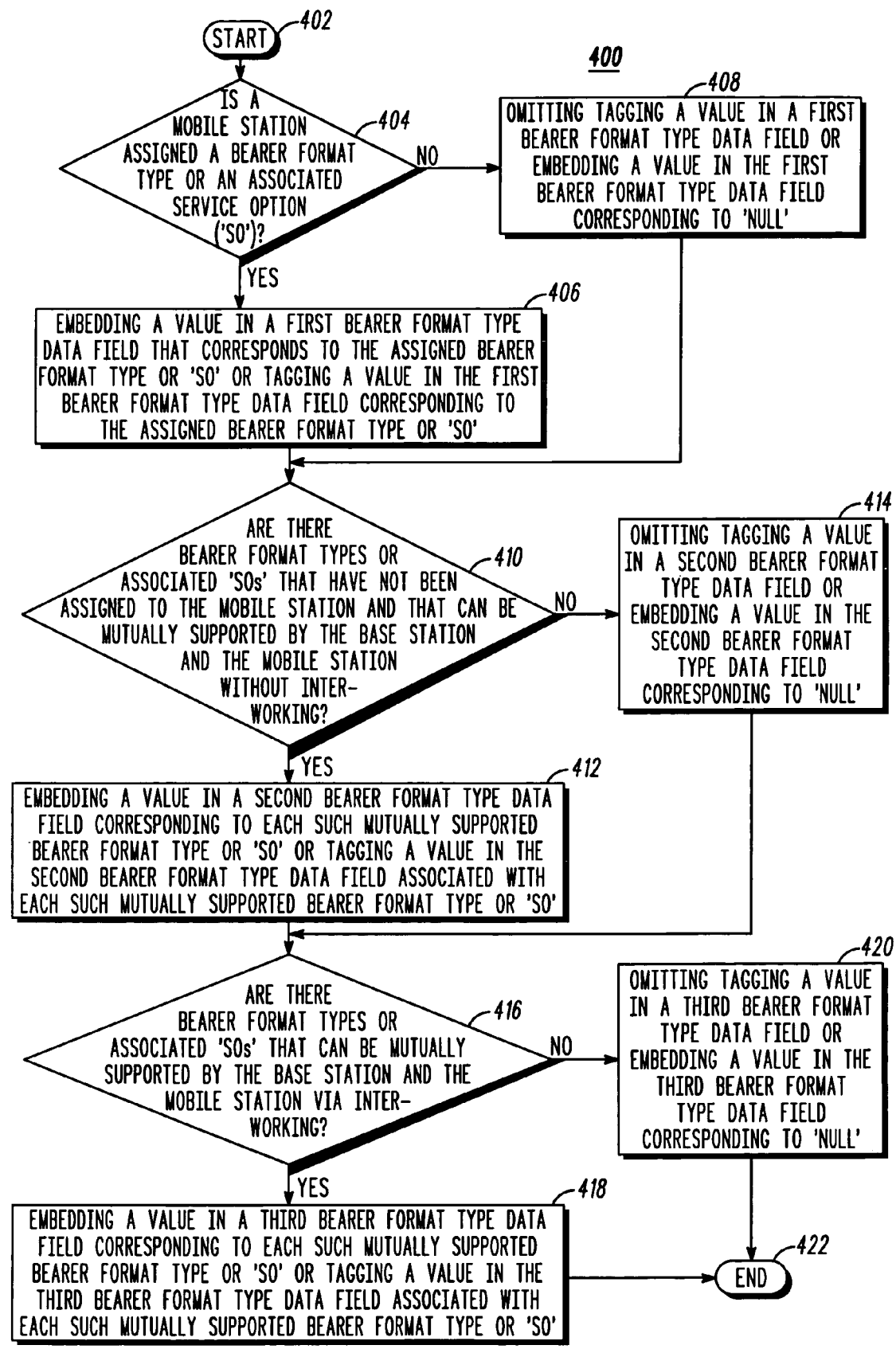
FIG. 4 is a logic flow diagram of steps executed by a base station of FIG. 1 in assembling the bearer format type message of FIG. 3 in accordance with an embodiment of the present invention.

FIG. 4 is a logic flow diagram 400 of steps executed by a BS, such as BSs 110 and 170, and in particular processors 122 and 182 of BSCs 120 and 180, in assembling a bearer format type message such as bearer format type message 300 in accordance with an embodiment of the present invention. When assembled by BS 110, message 300 may comprise a modified version of a CM Service Request message or an Assignment Complete message, which CM Service Request message or Assignment Complete message is modified to include the bearer format type data fields 301-303.

Logic flow diagram 400 begins (402) when the BS, such as BS 110, determines (404) whether the MS serviced by the BS, that is, MS 102, is assigned a bearer format type or an associated SO. Although the assembly of bearer format type message 300 is described herein with respect to originating MS 102 and the BS servicing MS 102, that is, BS 110, one of ordinary skill in the art realizes that bearer format type message 300 may also be assembled by a BS, such as BS 170, servicing a terminating MS, that is, MS 192. When BS 110 determines that MS 102 is assigned a bearer format type or an associated SO, the BS embeds (406) a value in first bearer format type data field 301 that corresponds to the assigned bearer format type or associated SO, or associates a tag with the value in first bearer format type data field 301 corresponding to the assigned bearer format type or associated SO. When BS 110 determines that MS 102 is not assigned a bearer format type or an associated SO, the BS (408) omits tagging any bearer format type or SO in first bearer format type data field 301 or embeds, in the data field, a value corresponding to 'NULL.'

BS 110 then determines (410) whether the BS knows of bearer format types or associated SOs that have not been assigned to MS 102 and that can be mutually supported by the MS and the BS without interworking, that is, without bearer format type translations by the BS. When BS 110 determines one or more bearer format types or associated SOs that are mutually supported by both the BS and MS 102 without interworking and that have not been assigned to the MS, the BS embeds (412), in second bearer format type data field 302, a value corresponding to each such mutually supported bearer format type or SO or associates a tag with each value in second bearer format type data field 302 corresponding to the mutually supported bearer format type or SO. When BS 110 is unable to determine at least one bearer format type or SO that is mutually supported by the BS and MS 102 without interworking and that has not been assigned to the MS, the BS (414) omits tagging any bearer format type or SO in second bearer format type data field 302 or embeds, in the data field, a value corresponding to 'NULL.'

BS 110 then determines (416) whether the BS knows of bearer format types or associated SOs that are mutually supported by MS 102 and the BS 110 via interworking. That is, BS 110 determines whether it is capable of supporting one or more bearer format types or associated SOs that is not natively supported by MS 102 but is a bearer format type that the BS is capable of translating to a bearer format type supported by the MS. When BS 11O determines one or more bearer format types or associated SOs that are not natively supported by MS 102 but is a bearer format type that the BS is capable of translating to a bearer format type supported by the MS, the BS embeds (418), in third bearer format type data field 303, a value corresponding to each such mutually supported bearer format type or SO or associates a tag with each value in third bearer format type data field 303 corresponding to the supported bearer format type or SO. When BS 110 is unable to determine a bearer format type that is not natively supported by MS 102 but is a bearer format type that the BS is capable of translating to a bearer format type supported by the MS, the BS (420) omits tagging any bearer format type in third bearer format type data field 303 or embeds, in the data field, a value corresponding to 'NULL.' Logic flow 400 then ends (422).

Referring again to FIG. 2, in response to receiving (216) the first bearer format type information from BS 110, Packet Switch 130 may further determine whether any bearer format types or associated SOs not identified in the first bearer format type information can be supported via translation, that is, via interworking, by Packet Switch 130 to and from one or more of the bearer format types or associated SOs that are assigned to originating MS 102 or that are mutually supported by MS 102 and serving BS 110 without interworking. That is Packet Switch 130 further determines whether any additional bearer format types or associated SOs can be supported via translation, that is, via interworking, by Packet Switch 130, and in particular by transcoder 133 of the Packet Switch, to and from one or more of the bearer format types or SOs identified in first bearer format type data field 301 or second bearer format type data field 302. When Packet Switch 130 determines one or more such bearer format types/SOs, Packet Switch 130 further forwards (228) such bearer format types/SOs to terminating Packet Switch 160 as part of the second bearer format type information.

When the first bearer format type information is received by Packet Switch 130 from BS 110 via a first bearer format type message comprising bearer format type data fields 301-303, Packet Switch 130 may inform Packet Switch 160 of the first bearer format type information, as well as any bearer format types/SOs that can be supported via interworking by Packet Switch 130, by conveying a second bearer format type message comprising a modified version of data fields 301-303. For example, the second bearer format type message may comprise a modified version of a SIP Invite message, which SIP Invite message has been modified to include data fields 301-303 received by, and possibly modified by, Packet Switch 130.

In one embodiment of the present invention, Packet Switch 130 may modify data fields 301-303 by adding, to third bearer format type data field 303, a value corresponding to each such bearer format type or SO that can be supported via translation by Packet Switch 130 and which bearer format type/SO is not identified in the first bearer format type message. In another embodiment of the present invention, when data field 303 comprises a list of bearer format types, Packet Switch 130 may modify data fields 301-303 by associating a tag with each bearer format type listed in data field 303 that corresponds to a bearer format type or SO that can be supported via translation by Packet Switch 130 and that is not tagged in the first bearer format type message.

As a result, the second bearer format type information conveyed by Packet Switch 130 to Packet Switch 160 informs Packet Switch 160 of a bearer format type/SO assigned to originating MS 102, if any were so assigned, and of each bearer format type that may be directly supported by MS 102 or that may be supported by MS 102 in conjunction with interworking by the transcoder 126, 133 of one or more of BS 110 and Packet Switch 130. That is, terminating Packet Switch 160 is informed of the bearer format types/SOs that the originating side of communication system 100, that is MS 102, BS 110, and core network 140, is capable of supporting during the communication session.

In response to receiving (230) the second bearer format type information, terminating Packet Switch 160 stores (232) the received second bearer format type information in the one or more memory devices 162 of the Packet Switch or the one or more memory devices 167 of bearer format controller 165. Packet Switch 160 further conveys (234) third bearer format type information that includes the second bearer format type information to the BS serving terminating MS 192, that is, second, or terminating, BS 170.

Similar to Packet Switch 130, Packet Switch 160 may further determine whether any bearer format types or associated SOs not identified in the second bearer format type information can be supported via translation, that is, via interworking, by Packet Switch 160 to and/or from the bearer format types/SOs identified in the in the second bearer format type information. For example, Packet Switch 160 may further determine whether any additional bearer format types or associated SOs can be supported via translation, that is, via interworking, by Packet Switch 160, and in particular by transcoder 163 of the Packet Switch, to and from the bearer format types or SOs identified in the first bearer format type information. When Packet Switch 160 determines one or more such bearer format types/SOs, Packet Switch 160 further forwards (236) such bearer format types/SOs to BS 170 as part of the third bearer format type information.

When the second bearer format type information is received by Packet Switch 160 from Packet Switch 130 via a second bearer format type message comprising bearer format type data fields 301-303, Packet Switch 160 may inform BS 170 of second bearer format type information, as well as any additional bearer format types/SOs that can be supported via interworking by Packet Switch 130, by conveying a third bearer format type message comprising modified version of data fields 301-303. For example, the third bearer format type message may comprise a modified version of a Page Request message, an Assignment Request message, or a Bearer Request message, which Page Request message, Assignment Request message, or Bearer Request message has been modified to include the data fields 301-303 received by, and possibly modified by, Packet Switch 160.

In one embodiment of the present invention, Packet Switch 160 may modify data fields 301-303 by adding, to third bearer format type data field 303, a value corresponding to each such bearer format type or SO that can be supported via translation by Packet Switch 160 and which bearer format type/SO is not identified in the second bearer format type message. In another embodiment of the present invention, when data field 303 comprises a list of bearer format types, Packet Switch 160 may modify data fields 301-303 by associating a tag with each bearer format type listed in data field 303 that corresponds to a bearer format type or SO that can be supported via translation by Packet Switch 160 and that is not tagged in the second bearer format type message.

In response to receiving (238), from Packet Switch 160, the third bearer format type information, BS 170 assigns (2300) to terminating MS 192 one of the bearer format types/SOs identified in the third bearer format type information. For example, Packet Switch 160 may convey the third bearer format type information to BS 170 in the third bearer format type message, which message includes bearer format type data fields 301-303. When the bearer format type data fields 301-303 received by BS 170 include a tag or value embedded in bearer format type data field 301 identifying a bearer format type/SO assigned to MS 102, then BS 170 may then attempt to assign to terminating MS 192 the bearer format type/SO identified in bearer format type data field 301. When the bearer format type data fields 301-303 received by BS 170 include one or more tags or values embedded in bearer format type data field 302 identifying one or more bearer format types/SOs mutually supported by MS 102 and BS 130 without requiring interworking by BS 130, then BS 170 may then attempt to successively assign, to terminating MS 192, each bearer format type/SO identified in bearer format type data field 302 until an assignment is successful. When the bearer format type data fields 301-303 received by BS 170 include one or more tags or values embedded in bearer format type data field 303 identifying one or more bearer format types/SOs mutually supported by MS 102 and BS 130 and requiring interworking by one or more of BS 130 and Packet Switch 130, then BS 170 may attempt to successively assign, to terminating MS 192, each bearer format type/SO identified in bearer format type data field 303 and supported by BS 170 until an assignment is successful.

Since interworking may cause degradation in a quality of conveyed voice, it is desirable to minimize an amount of interworking performed by communication system 100 during the communication session between MS 102 and MS 192. Optimally, no interworking is performed by the communication system network and the communication session is a TrFO communication session. Therefore, when bearer format types are identified in more than one bearer format type data field of bearer format type data fields 301-303, BS 170 may first attempt to assign a bearer format type/SO identified in bearer format type data field 301. When no bearer format type/SO is identified in bearer format type data field 301 or the attempted assignment is unsuccessful, BS 170 may attempt to assign a bearer format type/SO identified in bearer format type data field 302. When no bearer format type/SO is identified in either bearer format type data field 301 or 302 or an attempted assignment of each bearer format type/SO identified in bearer format type data fields 301 and 302 is unsuccessful, BS 170 may assign a bearer format type/SO identified in bearer format type data field 303.

In response to assigning a bearer format type/SO to MS 192, BS 170 (242) stores the assigned bearer format type/SO. BS 170 further conveys (244) to terminating Packet Switch 160, and in particular to bearer format controller 165, and the terminating Packet Switch receives (246) from the BS, fourth bearer format type information comprising the bearer format type assigned to MS 192 and any other bearer format types mutually supported by MS 192 and BS 170, with or without interworking by transcoder 186. Preferably, BS 170 informs Packet Switch 160 of the assigned and/or mutually supported bearer format types/SOs by conveying to the Packet Switch a fourth bearer format type message comprising bearer format type data fields 301-303 and that is assembled by the BS as described in detail above with respect to FIG. 4. For example, the fourth bearer format type message may comprise a modified version of a Page Response message, an Assignment Complete message, or a Bearer Response message, which Page Response message, Assignment Complete message, or Bearer Response message has been modified to include the bearer format type data fields 301-303 assembled by BS 170. As a result, terminating Packet Switch 160 may now possess information concerning the bearer format types/SOs that may be supported by the originating side of communication system 100, that is, MS 102, BS 110, and Packet Switch 130, and by the terminating side of the network, that is, Packet Switch 160, BS 170, and MS 192.

Therefore, in one embodiment of the present invention, in response to receiving (246) the fourth bearer format type information from BS 170, terminating Packet Switch 160, and in particular bearer format controller 165, may select (248) a bearer format type for the communication session involving MSs 102 and 192. Packet Switch 160 then informs (250) the originating side of communication system 100, and in particular Packet Switch 130, of the selected bearer format type. Based on the selected bearer format type, each of Packet Switch 130, BS 110, and MS 102 may determine (252) bearer format types to be used by their respective transcoders in conveying bearer traffic between MS 102 and MS 192 and logic flow 200 then ends (266).

In one embodiment of the present invention, Packet Switch 160 may informs Packet Switch 130 of the selected bearer type format by modifying the bearer type data fields 301-303 received via a fourth bearer format type message by Packet Switch 160 from BS 170 and conveying a bearer format type message comprising the modified data fields to Packet Switch 130. For example, the bearer format type message may comprise a modified version of an SIP_183 message or an SIP-_Update message, which SIP_183 message or SIP_Update message has been modified to include the data fields 301-303 received by Packet Switch 160 from BS 170 and further possibly modified by the Packet Switch. Packet Switch 130 may then propagate these modified versions of data fields 301-303 to BS 110 and, based on the modified versions of the data fields, each of Packet Switch 130 and BS 110 may determine bearer format types to be used by their respective transcoder 133, 126 or whether to remove the transcoder from the bear path of the communication session. BS 110 may further determine a bearer format type to be used by MS 110 and assign to the MS the determined bearer format type.

Figure 5:
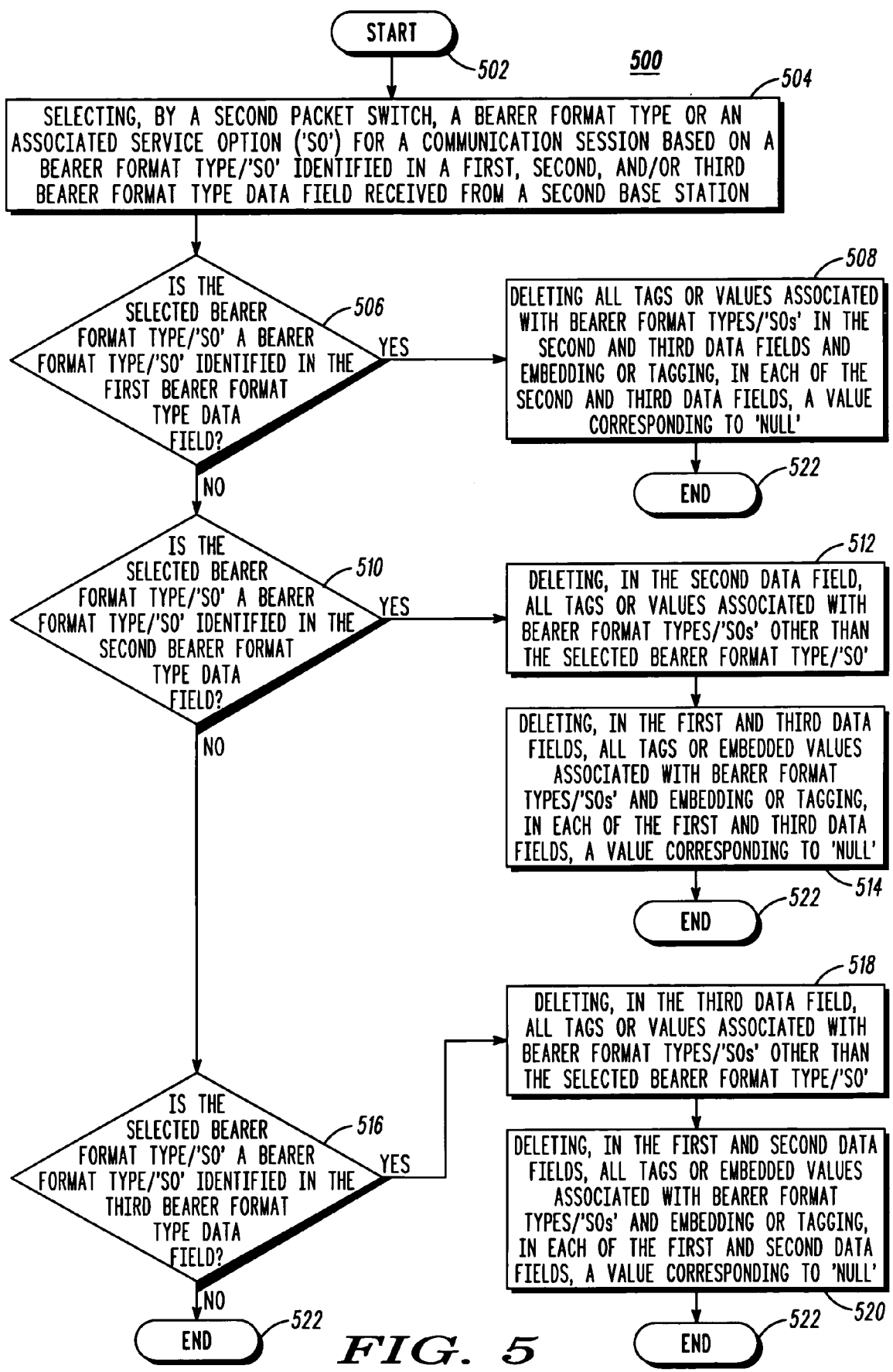
FIG. 5 is a logic flow diagram of steps executed by a Packet Switch of FIG. 1 in modifying bearer format type data fields of the bearer format type message of FIG. 3 in accordance with an embodiment of the present invention.

For example, FIG. 5 is a logic flow diagram 500 of steps executed by Packet Switch 160 in modifying bearer type data fields 301-303 of bearer format message 300 in accordance with an embodiment of the present invention. Logic flow diagram 500 begins (502) when Packet Switch 160 selects (504) a bearer format type/SO for the communication session from among one or more bearer format types/SOs identified as bearer format types/SOs capable of being supported by the communication system 100, that is, from one of bearer type data fields 301-303. When the selected bearer format type/SO is a bearer format type/SO identified as being assigned to terminating MS 192, that is, a bearer format type/SO identified (506) in bearer format type data field 301, terminating Packet Switch 160 deletes (508) all tags in bearer format type data fields 302 and 303 or deletes all values embedded in fields 302 and 303 and embeds in each of fields 302 and 303 a value corresponding to 'NULL.' Logic flow 500 then ends (522).

When the selected bearer format type/SO is a bearer format type/SO identified as being mutually supported by terminating MS 192 and terminating BS 170 without interworking, that is, a bearer format type/SO identified (510) in bearer format type data field 302, terminating Packet Switch 160 deletes (512) all tags in bearer format type data field 302 associated with a bearer format type/SO other than the selected bearer format type/SO or deletes all values embedded in field 302 by BS 170 other than the value associated with the selected bearer format type/SO. Terminating Packet Switch 160 further deletes (514) all tags in bearer format type data fields 301 and 303 or deletes all values embedded in fields 301 and 303 and embeds in each of fields 301 and 303 a value corresponding to 'NULL.' Logic flow 500 then ends (522).

When the selected bearer format type/SO is a bearer format type/SO identified as being mutually supported by terminating MS 192 and BS 170 with interworking, that is, a bearer format type/SO identified (516) in bearer format type data field 303, terminating Packet Switch 160 deletes (518) all tags in bearer format type data field 303 associated with a bearer format type/SO other than the selected bearer format type/SO or deletes all values embedded in field 303 other than the value associated with the selected bearer format type/SO. Terminating Packet Switch 160 further deletes (520) all tags in bearer format type data fields 301 and 302 or deletes all values embedded in fields 301 and 302 and embeds in each of fields 301 and 302 a value corresponding to 'NULL.' Logic flow 500 then ends (522).

Referring again to FIG. 2, in another embodiment of the present invention, in response to receiving (246) the fourth bearer format type information from BS 170, terminating Packet Switch 160 may forward fifth bearer format type information to Packet Switch 130 comprising the fourth bearer format type information received from BS 170. That is, in response to receiving the fourth bearer format type information from BS 170, Packet Switch 160 may convey (254), to originating Packet Switch 130, bearer format information concerning the bearer format type assigned to terminating MS 192, bearer format types mutually supported by MS 192 and serving BS 170 without interworking, and bearer format types mutually supported by terminating MS 192 and BS 170 with interworking.

In addition, Packet Switch 160 may determine, and convey (256) to Packet Switch 130 as part of the fifth bearer format type information, any bearer format types or associated SOs that can be supported via interworking by Packet Switch 160, and in particular by transcoder 163 of the Packet Switch, to and/or from the bearer format types or associated SOs identified in the fourth bearer format type information.

When the fourth bearer format type information is received by Packet Switch 160 from BS 170 via a fourth bearer format type message comprising bearer format type data fields 301-303, Packet Switch 160 may convey the fifth bearer format type information to Packet Switch 130 via a fifth bearer format message comprising modified version of data fields 301-303 received from BS 170. Again, by way of example, the fifth bearer format type message may comprise a modified version of an SIP_183 message or an SIP_Update message, which SIP_183 message or SIP_Update message has been modified to include the data fields 301-303 received by Packet Switch 160 from BS 170 and further possibly modified by Packet Switch 160.

In the fifth bearer format type message, Packet Switch 160 may identify any bearer format types/SOs that can be supported via interworking by Packet Switch 160 and that are not identified in the fourth bearer format type message by modifying the third bearer format type data field 303 as is described in detail above. That is, in one embodiment of the present invention, Packet Switch 160 may modify data field 303 by adding to the data field a value corresponding to each such bearer format type or SO that can be supported via translation by Packet Switch 160. In another embodiment of the present invention, when data field 303 comprises a list of bearer format types, Packet Switch 160 may modify the data field by associating a tag with each bearer format type listed in data field 303 that corresponds to a bearer format type or SO that can be supported via translation by Packet Switch 160.

In response to receiving (258) the fifth bearer format type information from terminating Packet Switch 160, originating Packet Switch 130, and in particular bearer format controller 135, may select (2320) a bearer format type for the communication session involving MSs 102 and 192. Packet Switch 130 then informs (262) BS 110 of the selected bearer format type. Based on the selected bearer format type, BS 110 and MS 102 may determine (264) bearer format types to be used by their respective transcoders in conveying bearer traffic between MS 102 and MS 192 and logic flow 200 then ends (266).

Similar to the process described above with respect to Packet Switch 160 selecting a bearer format type and informing the originating side of communication system 100 of the selected bearer format type, Packet Switch 130 may inform BS 110 of the selected bearer type format by modifying the bearer type data fields 301-303 received by Packet Switch 130 via the fifth bearer format type message pursuant to the method depicted in logic flow diagram 500. Packet Switch 130 may then convey a message comprising the modified data fields to BS 110. Based on the modified versions of the data fields, BS 110 may determine bearer format types to be used by transcoder 126 or whether to remove the transcoder from the bear path of the communication session. BS 110 may further determine a bearer format type to be used by MS 110 and then assign, or alternatively reassign, to the MS the determined bearer format type.

Again, since it is desirable to minimize an amount of interworking and bearer format/SO reassignments performed by communication system 100 during the communication session between MS 102 and MS 19, when Packet Switch 130, 160 selects a bearer format type/SO for use in the communication session, the Packet Switch may first select a bearer format type/SO identified in bearer format type data field 301. When no bearer format type/SO is identified in bearer format type data field 301 or the attempted assignment is unsuccessful, the Packet Switch 130, 160 may then select a bearer format type/SO identified in bearer format type data field 302. When no bearer format type/SO is identified in either bearer format type data field 301 or 302 or an attempted assignment of each bearer format type/SO identified in bearer format type data fields 301 and 302 is unsuccessful, the Packet Switch 130, 160 may then select a bearer format type/SO identified in bearer format type data field 303.

By providing for a distribution of bearer format type information among one or more Network Elements 110, 130, 160, and 170 located along a bearer path of a communication session, communication system 100 facilitates a selection of a bearer format type for the communication session. The bearer format type information informs of bearer format types supported by one or more MSs engaging in the communication session and further of Network Elements capable of translating bearer formats during the communication session. In one embodiment of the present invention, the bearer format types are conveyed in bearer format type data fields 301-303 of bearer format type messages 300, which data fields may be modified by each Network Element 110, 130, 160, and 170 in order to identify the bearer format type capabilities of the Network Element. A bearer format controller 135, 165 may then select a bearer format type for the communication session based on bearer format types identified in the bearer format type messages. The bearer format controller 135, 165 may then inform one or more Network Elements of the selected bearer format type by modifying the bearer format type data fields of a bearer format type message received by the controller and conveying the modified bearer format type data fields to the Network Elements.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing bearer format type capabilities in a cellular communication system, the method comprising:
   conveying first bearer format type information, wherein the first bearer format type information comprises, when a first bearer format type is assigned to a first mobile station, the assigned bearer format type and further comprises, the assigned first bearer format and, when the first mobile station and a first base station mutually support a second bearer format, the second bearer format;
   receiving the first bearer format type information from the first base station;
   in response to receiving the first bearer format type information, determining whether a first Network Element other than the first base station and one or more of the first mobile station and the first base station mutually support a third bearer format type;
   in response to receiving the first bearer format type information, conveying second bearer format information comprising the first bearer format type information and, when the first Network Element and one or more of the first mobile station and the first base station mutually support a third bearer format type, the third bearer format type;
   receiving the second bearer format type information;
   in response to receiving the second bearer format type information, determining whether a second Network Element other than the first base station and one or more of the first mobile station, the first base station, and the first Network Element mutually support a fourth bearer format type;
   in response to receiving the second bearer format type information, conveying third bearer format type information comprising the received second bearer format type information and, when the second Network Element and one or more of the first mobile station, the first base station, and the first Network Element mutually support a fourth bearer format type, the fourth bearer format type;
   receiving the third bearer format type information;
   in response to receiving the second bearer format type information, assigning a bearer format to a second mobile station based on the third bearer format type information;
   conveying fourth bearer format type information to the second Network Element, wherein the fourth bearer format type information comprises the bearer format assigned to the second mobile station and, when the second mobile station and the second base station mutually support a bearer format other than the assigned bearer format, the other bearer format;
   conveying fifth bearer format type information to the first Network Element, wherein the fifth bearer format type information comprises the fourth bearer format type information and further comprises any bearer format types that are mutually supported by the second Network Element and one or more of the second mobile station and a base station serving the second mobile station and are not identified by the fourth bearer format type information; and
   receiving the fifth bearer format type information; and
   based on the fifth bearer format type information, selecting a bearer format type for a communication session involving the first mobile station and the second mobile station.

2. The method of claim 1, further comprising assigning the first bearer format to the first mobile station.

3. The method of claim 1, wherein each bearer format type information of the first, second, and third bearer format type information comprises a bearer format message having a plurality of bearer format type data fields and wherein each plurality of bearer format type data fields of each bearer format message comprises one of a same plurality of bearer format type data fields of the preceding bearer format type message or a modified version of the plurality of bearer format type data fields of the preceding bearer format type message.

4. The method of claim 1, wherein the fifth bearer format type information comprises a bearer format message having a plurality of bearer format type data fields and wherein the method further comprises informing the first base station of the selected bearer type format by conveying to the first base station a bearer format message comprising one of a same plurality of bearer format type data field of the fifth bearer format type message or a modified version of the plurality of bearer format type data fields of the fifth bearer format type message.

5. A Packet Switch comprising:
   at least one memory device that maintains at least one bearer format type supported by an associated transcoder; and
   a processor coupled to the at least one memory device that receives bearer format type information comprising a first bearer format type assigned to a mobile station, a second bearer format type mutually supported by the mobile station and a base station serving the mobile station, and a third bearer format type mutually supported by the mobile station and one or more of the base station and a second Network Element interposed between the base station and the Packet Switch, conveys the received bearer format type information to a first Network Element, determines whether the Packet Switch and one or more of the mobile station, the base station, and the second Network Element mutually support a fourth bearer format type, and in response to determining that the Packet Switch and one or more of the mobile station, the base station, and the second Network Element mutually support a fourth bearer format type, conveying the fourth bearer format type to the first Network Element.

6. The Packet Switch of claim 5, wherein the processor further conveys to the first Network Element a fifth bearer format type mutually supported by the Packet Switch and one or more of mobile station and the base station.

7. A base station controller that is configured to receives bearer format type information comprising at least one of a first bearer format type assigned to a first mobile station and a second bearer format type mutually supported by the first mobile station and a base station serving the first mobile station and that assigns a bearer format type to a second mobile station based on the received bearer format type information.

8. The base station controller of claim 7, wherein the bearer format type information received by the base station controller further comprises a third bearer format type mutually supported by the mobile station and one or more of the base station and a Packet Switch.

9. The base station controller of claim 7, wherein the base station controller further is configured to conveys a message to a Network Element upstream from the base station controller informing of the bearer format type assigned to the second mobile station and of any other bearer format types mutually supported by the base station controller and the second mobile station.

10. A system for distributing bearer format type information comprising:
a first base station that comprises a first transcoder and that conveys first bearer format type information, wherein the first bearer format type information comprises, when a first bearer format type is assigned to a first mobile station, the assigned bearer format type and further comprises, when the first mobile station and the first base station mutually support a second bearer format, the second bearer format;
a first Packet Switch that comprises a second trancoder and that receives the first bearer format type information from the first base station, determines whether the first Packet Switch and one or more of the first mobile station and the first base station mutually support a third bearer format type, and conveys second bearer format information comprising the first bearer format type information and, when the first Packet Switch and one or more of the first mobile station and the first base station mutually support a third bearer format type, the third bearer format type;
a second Packet Switch that comprises a third transcoder and that receives the second bearer format type information from the first base station, determines whether the second Packet Switch and one or more of the first mobile station, the first base station, and the first Packet Switch mutually support a fourth bearer format type, and conveys third bearer format type information comprising the received second bearer format type information and, when the second Packet Switch and one or more of the first mobile station, the first base station, and the first Packet Switch mutually support a fourth bearer format type, the fourth bearer format type; and
a second base station that comprises a fourth transcoder and that receives the third bearer format type information from the second Packet Switch and assigns a bearer format to a second mobile station serviced by the second base station based on the third bearer format type information.

11. The system of claim 10, wherein the first base station further assigns the first bearer format to the first mobile station.

12. The system of claim 10, wherein each bearer format type information of the first, second, and third bearer format type information comprises a bearer format message having a plurality of bearer format type data fields and wherein each plurality of bearer format type data fields of each bearer format message comprises one of a same plurality of bearer format type data fields of the preceding bearer format type message or a modified version of the plurality of bearer format type data fields of the preceding bearer format type message.

13. The system of claim 10, wherein the second base station conveys fourth bearer format type information to the second Packet Switch, wherein the fourth bearer format type information comprises the bearer format assigned to the second mobile station and, when the second mobile station and the second base station mutually support a bearer format other than the assigned bearer format, the other bearer format; and wherein the second Packet Switch receives the fourth bearer format type information and, based on the fourth bearer format type information, selects a bearer format type for a communication session involving the first mobile station and the second mobile station.

14. The system of claim 13, wherein the fourth bearer format type information comprises a bearer format message having a plurality of bearer format type data fields and wherein the second Packet Switch informs the first packet switch of the selected beare type format by conveying to the first Packet Switch a bearer format message comprising one of a same plurality of bearer format type data fields of the fourth bearer format type message or a modified version of the plurality of bearer format type data fields of the fourth bearer format type message.

15. The system of claim 10, wherein the second base station conveys fourth bearer format type information to the second Packet Switch, wherein the fourth bearer format type information comprises the bearer format assigned to the second mobile station and, when the second mobile station and the second base station mutually support a bearer format other than the assigned bearer format, the other bearer format, wherein the second packet switch conveys fifth bearer format type information to the first packet switch, wherein the fifth bearer format type information comprises the fourth bearer format type information and further comprises any bearer format types that are mutually supported by the second packet switch and one or more of the second mobile station and the second base station and are not identified by the fourth bearer format type information, and wherein the first Packet Switch receives the fifth bearer format type information and, based on the fifth bearer format type information, selects a bearer format type for a communication session involving the first mobile station and the second mobile station.

16. The system of claim 15, wherein the fifth bearer format type information comprises a bearer format message having a plurality of bearer format type data fields and wherein the first Packet Switch informs the first base station of the selected beare type format by conveying to the first base station a bearer format message comprising one of a same plurality of bearer format type data field of the fifth bearer format type message or a modified version of the plurality of bearer format type data fields of the fifth bearer format type message.

* * * * *